United States Patent

Kawasaki et al.

[11] Patent Number: 5,908,893
[45] Date of Patent: Jun. 1, 1999

[54] PROCESS FOR PRODUCING DEPROTEINIZED NATURAL RUBBER LATEX

[75] Inventors: Atsuko Kawasaki; Shinichi Nakade; Toshiaki Sakaki, all of Hyogo, Japan

[73] Assignees: Sumitomo Rubber Industries, Ltd., Hyogo; Kao Corporation, Tokyo, both of Japan

[21] Appl. No.: 08/848,639

[22] Filed: Apr. 29, 1997

Related U.S. Application Data

[63] Continuation of application No. 08/560,119, Nov. 17, 1995.

[30] Foreign Application Priority Data

Nov. 21, 1994 [JP] Japan .................................. 6-286933

[51] Int. Cl.$^6$ ........................................ C08K 3/04
[52] U.S. Cl. ........................ 524/575.5; 524/704; 524/925
[58] Field of Search ................................ 524/575.5, 925, 524/704

[56] References Cited

FOREIGN PATENT DOCUMENTS 1366934  9/1974  United Kingdom .

*Primary Examiner*—Peter D. Mulcahy
*Attorney, Agent, or Firm*—Sughrue, Mion, Zinn, Macpeak & Seas, PLLC

[57] ABSTRACT

A process is disclosed, by which protein can be removed easily and efficiently from natural rubber latex so that deproteinized natural rubber latex can be produced with high productivity and low cost. Particularly, a process for the production of deproteinized natural rubber latex is disclosed, which comprises treating natural rubber latex with a proteolytic enzyme and a surfactant to decompose protein in natural rubber latex, washing the treated natural rubber latex in the presence of a salt. According to the process, deproteinized natural rubber latex useful as a counter-allergy material having stable qualities can be produced easily with high productivity and low cost.

10 Claims, No Drawings

PROCESS FOR PRODUCING DEPROTEINIZED NATURAL RUBBER LATEX

This is a Continuation of application Ser. No. 08/560,119 filed Nov. 17, 1995.

FIELD OF THE INVENTION

This invention relates to a process for the production of deproteinized natural rubber latex.

BACKGROUND OF THE INVENTION

Because of the characteristic properties of natural rubber, such as large elongation, high elasticity, high tensile strength, good cohesive strength and the like, it has been used in various fields ranging from industrial articles including automobile tires, belts and adhesives to household articles such as gloves, as well as nursing tools, contraceptives and the like.

Since natural rubber is produced by collecting the rubber from natural rubber latex by coagulation and further carrying out various operations such as mastication, blending of various compounding ingredients, molding, vulcanizing and the like, it contains non-rubber components such as protein and the like as impurities originally contained in natural rubber latex.

Since kinds and quantity of such protein vary depending on the locality and production season of natural rubber latex, it causes variations in the quality, vulcanizing characteristic and the like of natural rubber and reduces mechanical characteristics such as creep characteristic, aging resistance and the like mechanical characteristics and electric characteristics of natural rubber such as insulation and the like electric characteristics of natural rubber.

In addition, it has been reported in recent years that dyspnea and anaphylactic symptoms (vascular edema, urticaria, collapse, cyanosis and the like) seemingly caused by the protein in natural rubber were induced by the use of medical tools made of natural rubber, such as surgical gloves for operation use, various types of catheter, masks for anesthesia use and the like.

In order to resolve these problems, attempts have been made to remove protein by concentrating natural rubber latex after washing with water, adding a surfactant if necessary, or by decomposing protein with a proteolytic enzyme.

These prior art methods, however, are not effective in sufficiently removing protein contained as contaminant in natural rubber latex.

SUMMARY OF THE INVENTION

In view of the above, it therefore becomes an object of the present invention to provide a process for the production of deproteinized natural rubber latex, which can remove protein easily and efficiently from natural rubber latex and produce deproteinized natural rubber latex with high productivity and low cost.

With the aim of overcoming the aforementioned problems involved in the prior art, the inventors of the present invention have conducted intensive studies and found as the result that protein contained in natural rubber latex can be removed simply and efficiently, by treating natural rubber latex with a proteolytic enzyme and a surfactant to decompose protein in natural rubber latex, and washing the treated natural rubber latex in the presence of a salt. The present invention has been accomplished on the basis of this finding. Other objects and advantages of the present invention will be made apparent as the description progresses.

DETAILED DESCRIPTION OF THE INVENTION

According to the process of the present invention, deproteinized natural rubber latex is produced by adding a proteolytic enzyme and a surfactant to a sufficiently diluted natural rubber latex to carry out decomposition treatment of protein on standing or with mixing, and adding one or more salts to the resulting latex which is subsequently washed and concentrated to get deproteinized natural rubber latex.

Natural rubber latex to be used as the material of the deproteinized natural rubber latex of the present invention may be either commercially available ammonia-preserved latex or fresh field latex.

Various inorganic salts and organic salts may be used as the salt to be used in the present invention. Examples of the inorganic salt include carbonates, bicarbonates, thiosulfates, borates and the like, and examples of the organic salt include organic acid (e.g., acetic acid) salts, amine salts and the like. Examples of metal atoms to form these salts include alkali metals (sodium, potassium and the like), alkaline earth metals (calcium, magnesium and the like), zinc and the like.

Specific examples of the aforementioned salts include sodium carbonate, sodium bicarbonate, sodium thiosulfate, sodium tetraborate, sodium acetate and the like, and these salts may be used alone or as a mixture of two or more.

It is preferable to use a salt having a monovalent cation, because latex becomes unstable and coagulates in some cases when a salt having divalent or more cation is used.

Any one of known proteases such as alkaline protease and the like can be used as the proteolytic enzyme with no particular limitation. The protease may be of any origin such as of a bacterium, a fungus, a yeast or the like, of which a bacterial protease is preferred. The protease may be used jointly with other enzymes such as lipase, esterase, amylase, laccase, cellulase and the like.

As the surfactant, any one of anionic, nonionic and amphoteric surfactants may be used.

Examples of the anionic surfactant include a carboxylic acid surfactant, a sulfonic acid surfactant, a sulfuric ester surfactant, a phosphoric ester surfactant and the like.

Specific examples of the carboxylic acid surfactant include a fatty acid salt, a polyvalent carboxylic acid salt, a rosin acid salt, a dimer acid salt, a polymer acid salt, a tall oil fatty acid salt and the like, each having 6 to 30 carbon atoms, of which a carboxylic acid salt having 10 to 20 carbon atoms is preferred. If the number of carbon atoms is smaller than 6, it would entail insufficient dispersion and emulsification of protein and impurities and if it is larger than 30, it would be difficult to disperse in water.

Specific examples of the sulfonic acid anionic surfactant include an alkyl benzene sulfonic acid salt, an alkyl sulfonic acid salt, an alkyl naphthalene sulfonic acid salt, a naphthalene sulfonic acid salt, a diphenyl ethersulfonic acid salt and the like.

Specific examples of the sulfuric ester anionic surfactant include an alkyl sulfuric ester salt, a distyrenated phenol sulfuric ester salt, a tristyrenated phenol sulfuric ester salt, a polyoxyalkylene alkyl sulfuric ester salt, a polyoxyalkylene alkyl phenyl ether sulfuric acid salt, a polyoxyalkylene distyrenated phenol sulfuric ester salt, a polyoxyalkylene tristyrenated phenol sulfuric ester salt, an α-olefin sulfuric ester salt, an alkyl succinic acid sulfuric ester salt and the like.

Specific examples of the phosphoric ester anionic surfactant include an alkyl phosphoric ester salt, a polyoxyalkylene phosphoric ester salt and the like.

Specific examples of the salt of these compounds include metal salts (Na, K, Ca, Mg, Zn and the like), ammonium salt, amine salts (triethanolamine salt, for example) and the like.

On the other hand, examples of the nonionic surfactant include a polyoxyalkylene ether surfactant, a polyoxyalkylene ester surfactant, a polyhydric alcohol fatty acid ester surfactant, a sugar fatty acid ester surfactant, an alkyl polyglycoside surfactant and the like.

Specific examples of the polyoxyalkylene ether nonionic surfactant include a polyoxyalkylene alkyl ether, a polyoxyalkylene alkyl phenyl ether, a polyoxyalkylene polyol alkyl ether, a polyoxyalkylene styrenated phenol ether, a polyoxyalkylene distyrenated phenol ether, a polyoxyalkylene tristyrenated phenol ether and the like. Specific examples of the just mentioned polyol include polyhydric alcohols having 2 to 12 carbon atoms, such as propylene glycol, glycerol, sorbitol, glucose, sucrose, pentaerythritol, sorbitan and the like.

Specific examples of the polyoxyalkylene ester nonionic surfactant include a polyoxyalkylene fatty acid ester and the like.

Specific examples of the polyhydric alcohol fatty acid ester nonionic surfactant include fatty acid esters of polyhydric alcohols having 2 to 12 carbon atoms or fatty acid esters of polyoxyalkylene polyhydric alcohols such as a sorbitol fatty acid ester, a sorbitan fatty acid ester, a fatty acid monoglyceride, a fatty acid diglyceride, a polyglycerol fatty acid ester and the like. Also available are polyalkylene oxide addition products of these esters (for example, a polyoxyalkylene sorbitan fatty acid ester, a polyoxyalkylene glycerol fatty acid ester and the like).

Specific examples of the sugar fatty acid ester nonionic surfactant include fatty acid esters of sucrose, glucose, maltose, fructose, a polysaccharide and the like, as well as polyalkylene oxide addition products thereof.

Specific examples of the alkyl polyglycoside nonionic surfactant include an alkyl glucoside, an alkyl polyglucoside, a polyoxyalkylene alkyl glucoside, a polyoxyalkylene alkyl polyglucoside and the like, as well as fatty acid esters therewith and polyalkylene oxide addition products thereof.

Examples of the alkyl group in the aforementioned anionic and nonionic surfactants include those having 4 to 30 carbon atoms. Examples of the polyoxyalkylene group include those comprising an alkylene group having 2 to 4 carbon atoms, such as one comprising ethylene oxide of an addition mole number of from 1 to 50. Examples of the fatty acid include straight or branched and saturated or unsaturated fatty acids having 4 to 30 carbon atoms.

Examples of the amphoteric surfactant include amino acid surfactant, betaine surfactant, amine oxide surfactant and the like.

If necessary or desirable, the aforementioned surfactant may be used in combination with a pH adjusting agent and a dispersant such as a styrene sulfonic acid copolymer, a naphthalenesulfonic acid formalin condensate, lignin sulfonic acid, a polycyclic aromatic sulfonic acid copolymer, a homopolymer of acrylic acid or maleic anhydride or a copolymer thereof, an isobutylene-acrylic acid copolymer, an isobutylene-maleic anhydride copolymer or the like.

According to the present invention, the salt may be added in an amount of 1 part by weight or more, preferably from 1 to 50 parts by weight, per 100 parts by weight of the solid rubber content of the latex. If the amount of added salt is smaller than 1 part by weight, it would bear no sufficient removing effect of protein and if it is larger than 50 parts by weight, it would produce no proportionally greater protein-removing effect but rather increase the production cost.

The proteolytic enzyme may be added in an amount of from 0.0001 to 20% by weight based on the solid rubber content of the latex. If the amount is smaller than 0.0001% by weight, it would bear no sufficient decomposition of protein in natural rubber latex and if it is larger than 20% by weight, it would cause reduction of the enzyme activity and rather increase the production cost. At the time of addition of the enzyme, other additives such as a pH adjusting agent and the like may also be added.

The surfactant may be added in an amount of from 0.001 to 20% by weight based on the solid rubber content of the latex.

Examples of the aforementioned pH adjusting agent include phosphoric acid salts such as potassium dihydrogenphosphate, dipotassium hydrogenphosphate, sodium dihydrogenphosphate, disodium hydrogenphosphate and the like, acetic acid salts such as potassium acetate, sodium acetate and the like and acids such as sulfuric acid, acetic acid, hydrochloric acid, nitric acid, citric acid, succinic acid and the like and salts thereof, as well as ammonia, potassium hydroxide, sodium hydroxide, sodium carbonate, sodium bicarbonate and the like. The pH adjusting agent may be added in an amount of from 0.01 to 0.5% by weight based on the solid rubber content of the latex.

Although it is not particularly limited, the decomposition treatment of protein may be carried out for a period of preferably from several minutes to about 1 week. During the decomposition treatment of protein, latex may be stirred or allowed to stand. The treatment temperature may be controlled according to need, and it is preferably controlled to a temperature of from 5 to 90° C., more preferably from 20 to 60° C. If the treatment temperature is higher than 90° C., it would quicken inactivation of the enzyme and if it is lower than 5° C., it would cause insufficient enzyme reaction.

After completion of the decomposition treatment of protein, the salt is added to the treated latex and the resulting mixture is washed to remove the decomposed protein and to recover deproteinized natural rubber particles. Such a washing may be effected by centrifugation, latex particle coagulation or the like means.

In the case of washing by centrifugation, the protein-decomposition treated solution is diluted with water to a rubber content of 5 to 40% by weight, preferably 10 to 30% by weight. Next, the thus diluted solution is centrifuged at 5,000 to 10,000 rpm for 1 to 60 minutes to separate a rubber cream in which deproteinized natural rubber particles are contained. Alternatively, the rubber cream may be separated continuously using a disc type centrifuge.

The thus separated cream can be used in the production of various rubber articles, as such, after dilution with water or after drying.

As occasion demands, the washing step of latex may be repeated several times. In that case, a salt may be added at the time of the second or later washing step, as well as at the first step. The kind and the amount of the salt are as defined in the foregoing.

Examples of the present invention are given below by way of illustration and not by way of limitation.

EXAMPLE 1

High ammonia latex of natural rubber was diluted with water to prepare 100 g of natural rubber latex having a solid rubber content of 30% by weight.

Next, the thus prepared latex was adjusted to pH 9.0 by adding sodium dihydrogenphosphate as a pH adjusting agent and then mixed with 0.02 g of a proteolytic enzyme (protease) and 1 g of a surfactant (sodium polyoxyethylene lauryl ether sulfate; Emal E-70C, manufactured by Kao Corp.), and the resulting mixture was allowed to stand at 30° C. for 24 hours.

After allowed to stand, the treated natural rubber latex was diluted with water to 300 g while adding 15 g (5% by weight based on the weight of the diluted latex) of sodium carbonate, followed by 30 minutes of centrifugation at 10,000 rpm.

The thus separated upper cream layer was dried under a reduced pressure for 24 hours, and the nitrogen content (nitrogen content after first washing) of the thus obtained rubber was measured based on the Kjeldahl method. The amount of the remaining protein can be calculated by multiplying the nitrogen content by a factor of 6.25.

Thereafter, the aforementioned cream layer was diluted with water to adjust the solid rubber content to about 10% by weight and subjected to centrifugation in the same manner as described above, the resulting cream layer was dried under a reduced pressure and then the nitrogen content (nitrogen content after second washing) of the thus obtained rubber was measured in the same manner as described above.

EXAMPLES 2 TO 10 AND 12

To 100 g of natural rubber latex prepared in the same manner as described in Example 1 (solid rubber content: 30% by weight) were added a pH adjusting agent, a proteolytic enzyme and a surfactant, followed by 24 hours of standing at 30° C. The same pH adjusting agent, proteolytic enzyme and surfactant as described in Example 1 were used herein.

After allowed to stand, the treated natural rubber latex was diluted with water to 300 g so as to give a solid rubber content of approximately 10% by weight, and at the same time a salt is added thereto. The kinds and the amounts of the added salts are shown in Table 1.

Next, dilution, centrifugation, and vacuum drying were carried out in the same manner as described in Example 1, and the nitrogen content of each rubber sample obtained after the first and second washing was measured in the same manner as in Example 1.

EXAMPLE 11

Decomposition treatment of protein was carried out in the same manner as described in Examples 2 to 10 and 12, except that the pH adjusting agent was not added at the time of protein decomposition.

Next, dilution, centrifugation, and vacuum drying were carried out in the same manner as described in Example 1, and the nitrogen content of each rubber sample obtained after the first and second washing was measured in the same manner as in Example 1.

COMPARATIVE EXAMPLE 1

Decomposition treatment of protein was carried out by adding a proteolytic enzyme and a surfactant to natural rubber latex which has been prepared in the same manner as described in Example 1.

Next, dilution, centrifugation, and vacuum drying were carried out in the same manner as described in Example 1, and the nitrogen content of each rubber sample obtained after the first and second washing was measured in the same manner as in Example 1.

COMPARATIVE EXAMPLE 2

Decomposition treatment of protein was carried out by adding a pH adjusting agent, a proteolytic enzyme and a surfactant to natural rubber latex which has been prepared in the same manner as described in Example 1.

Next, dilution, centrifugation, and vacuum drying were carried out in the same manner as described in Example 1, and the nitrogen content of each rubber sample obtained after the first and second washing was measured in the same manner as in Example 1.

COMPARATIVE EXAMPLE 3

Decomposition treatment of protein was carried out by adding a proteolytic enzyme and a surfactant to natural rubber latex which has been prepared in the same manner as described in Example 1, and then adding sodium carbonate in an amount of 6% by weight based on the resulting latex.

After the decomposition treatment, dilution (at this stage, the sodium carbonate content becomes 2% by weight based on the total liquid volume), centrifugation, and vacuum drying were carried out in the same manner as described in Example 1, and the nitrogen content of each of the rubber samples obtained after the first and second washing steps was measured in the same manner as in Example 1.

The kinds and the amounts of the salts used in Examples 1 to 12 and Comparative Examples 1 to 3 are shown in Table 1 together with the nitrogen content of each rubber sample after the decomposition treatment of protein.

TABLE 1

|  | pH Adjusting Agent | | Salt added while washing | | Total amount of added salts (wt %*2) | Nitrogen content | |
|---|---|---|---|---|---|---|---|
|  |  |  |  |  |  | after 1st washing (N %) | after 2nd washing (N %) |
|  | kinds | amount (wt %*1) | kinds | amount (wt %*2) |  |  |  |
| Example 1 | sodium dihydrogen-phosphate | 0.03 | sodium carbonate | 5 | 5.01 | 0.025 | 0.009 |
| Example 2 | sodium dihydrogen-phosphate | 0.03 | sodium acetate | 5 | 5.01 | 0.026 | 0.010 |
| Example 3 | sodium dihydrogen-phosphate | 0.03 | sodium thiosulfate | 5 | 5.01 | 0.024 | 0.009 |

TABLE 1-continued

|  | pH Adjusting Agent | | Salt added while washing | | Total amount of added salts (wt %*2) | Nitrogen content | |
|---|---|---|---|---|---|---|---|
|  | | | | | | after 1st washing (N %) | after 2nd washing (N %) |
|  | kinds | amount (wt %*1) | kinds | amount (wt %*2) | | | |
| Example 4 | sodium dihydrogen-phosphate | 0.03 | sodium bicarbonate | 5 | 5.01 | 0.027 | 0.011 |
| Example 5 | sodiuin dihydrogen-phosphate | 0.03 | sodium tetraborate sodium carbonate | 2.5 2.5 | 5.01 | 0.025 | 0.011 |
| Example 6 | sodium dihydrogen-phosphate | 0.03 | sodium carbonate | 0.1 | 0.11 | 0.039 | 0.017 |
| Example 7 | sodium dihydrogen-phosphate | 0.03 | sodium carbonate | 0.5 | 0.51 | 0.034 | 0.016 |
| Example 8 | sodium dihydrogen-phosphate | 0.03 | sodium carbonate | 1 | 1.01 | 0.030 | 0.014 |
| Example 9 | sodium dihydrogen-phosphate | 0.03 | sodium carbonate | 2 | 2.01 | 0.027 | 0.013 |
| Example 10 | sodium dihydrogen-phosphate | 0.03 | sodium carbonate | 6 | 6.01 | 0.025 | 0.011 |
| Example 11 | not added | 0 | sodium carbonate | 5 | 5.00 | 0.031 | 0.014 |
| Example 12 | sodium dihydrogen-phosphate | 0.03 | calcium carbonate | 0.1 | 0.11 | 0.033 | 0.016 |
| Comparative Example 1 | not added | 0 | not added | 0 | 0 | 0.085 | 0.028 |
| Comparative Example 2 | sodium dihydrogen-phosphate | 0.03 | not added | 0 | 0.01 | 0.080 | 0.025 |
| Comparative Example 3 | sodium carbonate | 6 | not added | 0 | 2 | 0.092 | 0.030 |

Note:
*1% by weight based on the weight of the latex of a rubber content of 30% by weight
*2% by weight based on the weight of the latex of a rubber content of about 10% by weight It is evident from the results shown in Table 1 that protein is removed efficiently from natural rubber by the addition of salts in the Examples, whereas a large quantity of protein remains unremoved in the Comparative Examples.

Also, when the salt is added at the time of the decomposition treatment of protein, it is considered that the efficiency of the proteolytic enzyme may be reduced since, for example, the latex pH may shift outside the optimum range for the protein decomposition.

Thus, according to the present invention, protein in natural rubber latex can be removed efficiently and easily by decomposing protein in the latex and then adding salts when the treated latex is washed, so that deproteinized natural rubber latex useful as a counter-allergy material having stable qualities can be produced easily.

Also, according to the present invention, deproteinized natural rubber latex can be produced with high productivity and low cost, because protein can be removed almost completely by at least one washing step after decomposition of protein.

In consequence, the deproteinized natural rubber latex obtained by the process of the present invention can be applied to various fields of articles which include daily necessaries such as gloves and the like, medical tools such as catheters and the like, sports goods such as golf club grip and rubber thread for ball and the like and industrial products such as tires and the like, as well as rubber nipples, teething rings, contraceptives and the like.

While the invention has been described in detail and with reference to specific embodiments thereof, it will be apparent to one skilled in the art that various changes and modifications can be made therein without departing from the spirit and scope thereof.

What is claimed is:

1. A process for producing a deproteinized natural rubber latex which comprises
    treating natural rubber latex with a proteolytic enzyme and a surfactant to decompose protein in the natural rubber latex,
    adding a salt to the treated natural rubber latex, and
    washing the treated natural rubber latex in the presence of said salt,
    wherein said salt is at least one compound selected from the group consisting of carbonate salts, bicarbonate salts, thiosulfate salts, borate salts, acetate salts, and amine salts, and wherein said salt is present in an amount of from 1 to 50 parts by weight per 100 parts by weight of the solid rubber content of the latex.

2. The process of claim 1, wherein said salt is at least one compound selected from the group consisting of sodium carbonate, sodium bicarbonate, sodium thiosulfate, sodium tetraborate and sodium acetate.

3. The process of claim 1, wherein said surfactant is at least one compound selected from the group consisting of a carboxylic acid surfactant, a sulfonic acid surfactant, a sulfuric ester surfactant, a phosphoric ester surfactant, a polyoxyalkylene ether surfactant, a polyoxyalkylene ester surfactant, a polyhydric alcohol fatty acid ester surfactant, a sugar fatty acid ester surfactant, an alkyl polyglycoside surfactant, amino acid surfactant, betaine surfactant, and amine oxide surfactant.

4. The process of claim 1, wherein said surfactant is used in an amount of from 0.001 to 20% by weight based on the solid rubber content of the latex.

5. The process of claim 1, wherein said proteolytic enzyme is alkaline protease.

6. The process of claim 1, wherein said proteolytic enzyme is used in an amount of from 0.0001 to 20% by weight based on the solid rubber content of the latex.

7. The process of claim 1, wherein said treatment of natural rubber latex with the proteolytic enzyme and the surfactant is carried out for a period of from several minutes to about 1 week.

8. The process of claim 1, wherein said treatment of natural rubber latex with the proteolytic enzyme and the surfactant is carried out at a temperature of from 5 to 90° C.

9. The process of claim 1, wherein said washing of the treated natural rubber is carried out by centrifugation or latex particle coagulation.

10. The process of claim 1, wherein said treatment of natural rubber latex with the proteolytic enzyme and the surfactant is carried out in the presence of a pH adjusting agent.

* * * * *